(12) United States Patent
Vogel et al.

(10) Patent No.: US 7,366,630 B2
(45) Date of Patent: Apr. 29, 2008

(54) MANAGEMENT OF ELECTRICAL CABLE INSTALLATIONS IN A BUILDING

(75) Inventors: Ronald J. Vogel, Camarillo, CA (US); Lee A. Watkins, Thousand Oaks, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 120 days.

(21) Appl. No.: 11/216,590

(22) Filed: Aug. 30, 2005

(65) Prior Publication Data

US 2006/0004543 A1    Jan. 5, 2006

Related U.S. Application Data

(63) Continuation-in-part of application No. 10/934,816, filed on Sep. 3, 2004.

(60) Provisional application No. 60/633,374, filed on Dec. 3, 2004, provisional application No. 60/584,303, filed on Jun. 29, 2004.

(51) Int. Cl.
    *G01R 27/28* (2006.01)
(52) U.S. Cl. .................... 702/117; 702/123
(58) Field of Classification Search ............... 702/117, 702/123
    See application file for complete search history.

(56) References Cited

U.S. PATENT DOCUMENTS

| | | | |
|---|---|---|---|
| 4,964,060 A | 10/1990 | Hartsog | |
| 5,036,479 A | 7/1991 | Prednis et al. | |
| 5,432,705 A | 7/1995 | Severt et al. | |
| 5,511,108 A | 4/1996 | Severt et al. | |
| 5,552,699 A | 9/1996 | Redmer | |
| 5,629,628 A | 5/1997 | Hinds et al. | |
| 5,664,105 A | 9/1997 | Keisling et al. | |
| 5,698,985 A | 12/1997 | Bottman | |
| 5,821,937 A | 10/1998 | Tonelli | |
| 5,831,610 A | 11/1998 | Tonelli | |
| 5,907,850 A | 5/1999 | Krause | |
| 5,946,301 A | 8/1999 | Swanson et al. | |
| 6,002,247 A | 12/1999 | Watkins | |
| 6,058,262 A | 5/2000 | Kawas | |
| 6,064,721 A | 5/2000 | Mohammadian | |
| 6,385,300 B1 | 5/2002 | Mohammadian | |
| 6,442,507 B1 | 8/2002 | Skidmore et al. | |
| 6,466,885 B2 | 10/2002 | Miller, Jr. | |
| 6,493,679 B1 | 12/2002 | Rappaport et al. | |
| 6,590,963 B2 | 7/2003 | Mohammadian | |

(Continued)

FOREIGN PATENT DOCUMENTS

CA    2278210    7/1998

(Continued)

*Primary Examiner*—John Barlow
*Assistant Examiner*—Stephen J. Cherry
(74) *Attorney, Agent, or Firm*—Allen, Dyer, Doppelt, Milbrath & Gilchrist, P.A.

(57) ABSTRACT

The installation of an electrical cable in a building and its subsequent testing are managed by first creating a computer database indicating the type of cable, the location where the cable is to be installed, the performance standard it should meet when installed in that location, and a test regimen to verify compliance with the performance standard. The database is then transferred into a hand held portable test instrument which is placed at the building site and connected to the cable to be tested.

10 Claims, 13 Drawing Sheets

U.S. PATENT DOCUMENTS

| | | |
|---|---|---|
| 6,611,147 B2 | 8/2003 | White |
| 6,625,454 B1 | 9/2003 | Rappaport et al. |
| 6,646,454 B2 | 11/2003 | Watkins |
| 6,731,102 B2 | 5/2004 | Gregorec |
| 6,738,454 B2 | 5/2004 | Mohammadian |
| 6,777,952 B2 | 8/2004 | Seymour |
| 6,778,934 B1 | 8/2004 | Hori et al. |
| 6,785,805 B1 | 8/2004 | House et al. |
| 6,791,336 B2 | 9/2004 | Krigel |
| 6,812,712 B2 | 11/2004 | Linzey |
| 6,820,225 B1 | 11/2004 | Johnson |
| 6,842,760 B1 | 1/2005 | Dorgan et al. |
| 6,847,213 B2 | 1/2005 | Renken et al. |
| 6,851,612 B2 | 2/2005 | Iasso et al. |
| 6,859,768 B1 | 2/2005 | Wakelam |
| 6,868,357 B2 | 3/2005 | Furse |
| 6,871,156 B2 | 3/2005 | Wallace et al. |
| 6,876,890 B1 | 4/2005 | Oleniczak |
| 6,876,960 B1 | 4/2005 | Naylor et al. |
| 6,944,569 B2 | 9/2005 | Harbord |
| 6,971,063 B1 | 11/2005 | Rappaport |
| 2002/0006799 A1 | 1/2002 | Rappaport et al. |
| 2003/0033187 A1 | 2/2003 | Jones et al. |
| 2003/0086537 A1 | 5/2003 | Schultz |
| 2003/0200062 A1 | 10/2003 | Dessureault |
| 2004/0038683 A1 | 2/2004 | Rappaport et al. |
| 2004/0133415 A1 | 7/2004 | Rappaport et al. |
| 2004/0143428 A1 | 7/2004 | Rappaport et al. |
| 2004/0208293 A1 | 10/2004 | Mohammadian et al. |
| 2004/0230387 A1* | 11/2004 | Bechhoefer .................. 702/58 |
| 2004/0236586 A1 | 11/2004 | Hirshkind, Jr. |
| 2004/0243326 A1 | 12/2004 | Daoud et al. |
| 2005/0027588 A1 | 2/2005 | Current |
| 2006/0015814 A1 | 1/2006 | Rappaport |

FOREIGN PATENT DOCUMENTS

| | | |
|---|---|---|
| DE | 19701726 | 7/1998 |
| EP | 1465320 | 10/2004 |
| GB | 2370127 | 6/2002 |
| GB | 2398931 | 9/2004 |

* cited by examiner

DISPLAY SCREEN SHOWING A LIST OF TESTED CABLES

| ID | Type | To | From | Result |
|---|---|---|---|---|
| Cable001 | CAT3 ▶ | 01Net01 | 01Panel01 | ✓ PASS |
| Cable002 | CAT5 ▶ | 01Net02 | 01Panel01 | ? |
| Cable003 | CAT5E ▶ | 01Net03 | 01Panel01 | Vo/IP 1000 |
| Cable004 | RG-6 ▶ | 01TV01 | 01Panel01 | ✓ PASS |
| Cable005 | CAT5E ▶ | 01Net04 | 01Panel01 | Vo/IP 1000 |
| Cable006 | CAT5E ▶ | 01Net05 | 01Panel01 | ✗ FAIL |
| Cable007 | CAT6 ▶ | 01Net06 | 01Panel01 | Vo/IP 1000 |

SORT  RESULTS  DEL CBL  ADD CBL

FIGURE 8

MANAGEMENT OF ELECTRICAL CABLE INSTALLATIONS IN A BUILDING

PRIORITY CLAIM

This application is a continuation in part of U.S. patent application Ser. No. 10/934,816 filed Sep. 3, 2004; which had claimed the priority of Provisional Application Ser. No. 60/584,303 filed Jun. 29, 2004. This application also claims the priority of Provisional Application Ser No. 60/633,374 filed Dec. 3, 2004.

FIELD OF THE INVENTION

The field of this invention is the installation of electrical cables in buildings.

BACKGROUND OF THE INVENTION

Modern buildings, including homes, offices, and industrial buildings, require a great deal of electrical cable to accommodate all of the various electrical accouterments that may now be desired. Besides the standard power circuits, low voltage lighting circuits, security alarm or fire warning systems, intercom circuits for voice communication, telephone circuits, and high frequency television circuits, there are often requirements for cable circuits which will transmit data in the gigabit frequency range, both within and outside of the building.

Electrical contractors and tradesmen have often installed electrical wiring in homes or industrial buildings in a sequence of separate and distinct projects. Wiring for electric power in the building might be done first. Then, for example, the intercom and security systems are installed. Subsequently wiring for telephone and high speed data circuits might be separate and additional projects. Those repetitious steps have been inefficient.

Standard industry practice has involved a great deal of work by workmen at the construction site to identify cable types as labelled by a manufacturer, connect each cable in its correct location, identify and make the proper performance tests, and record results of performance tests. Basic circuits such as those for firealarm systems or doorbells may require only simple tests such as for continuity and short circuits, but high speed data circuits in addition to various other tests require expensive equipment at the construction site to verify correct performance.

In the cable industry, and particularly when dealing with high-speed data cables, there is an industry standard process known as "Certification". This involves testing the individual cable against an industry standard, such as TIA 568, as established by the Telecommunications Industry Association. Traditional certifiers are all built to test an individual cable with a frequency sweep through a broad range of frequencies, and must also make other measurements associated with the specifications set down under TIA 568. But even that standard process of certification cannot provide a 100% certainty that the cable after it has been connected as part of a network will perform as desired.

When high speed data circuits are required, both making the installation and demonstrating that performance goals have been met can be a daunting task. Utilizing expensive equipment is often necessary, but minimizing cost is often an even greater priority. And when some cables are intended to later be interconnected by patchcords or switchboards into a network system, the complexity of both making the installation reliable and meeting its performance requirements is greatly increased.

Prior art test instruments and procedures have been available for dealing with many different aspects of cable installation office buildings, industrial buildings, and homes. But comprehensive overall management of both technical and business aspects of such projects has apparently not been fully addressed.

SUMMARY OF THE INVENTION

According to the present invention we introduce several important changes over existing standard practice. First, according to our method the entire building installation is planned in advance and a computer database model of it is created, so as to minimize the work that will be necessary at the construction site. Second, we provide a portable test instrument to be used at the construction site which does not require the tradesman to know in detail what he is testing for; when he connects the test instrument to the correct cable and pushes the "Test" button the correct test regimen for that cable is then automatically conducted in accordance with the database plan. And third, for the effective testing of signal throughput of high-speed data lines we provide an intelligent remote terminal which in conjunction with the portable test instrument utilizes the capability of the now standard and well proven Gigabit Ethernet transceiver chips.

PREFERRED FEATURE. According to a preferred feature of the invention the installation of an individual cable is managed in the following manner. A computer database is created indicating the desired performance that the cable should have after it is installed, as well as a test regimen that would be needed to verify that performance. The database is then stored in a portable test instrument which is positioned at the job site for applying the test regimen to the cable and comparing results to the desired performance standard.

THE PLANNING PROCESS. According the present method a personal computer is used for creating a comprehensive plan and a computer database model of the proposed installation. The database model includes a simulated floor plan with port locations, designations of the corresponding cables to terminate at those port locations, and the desired performance characteristics for each individual cable when installed at its respective location.

THE COMPREHENSIVE DATA TRANSFER. According to the method of the present invention the portable test instrument has information processing capabilities that are compatible with the computer. Once completed, the plan database and cable definitions and performance characteristics are concurrently downloaded from the computer into the portable test instrument. Thus, the portable test instrument then contains not only the data relating to how the installation should be made, but also complete data as to desired performance when the installation is completed.

ON-SITE BASIC TESTING. The method of the present invention particularly applies to testing individual cables. When the data describing each cable location is transferred into the portable test instrument, the performance requirements for that particular cable installation are also transferred there. Each cable is tested only after being placed in its operative location, and against the performance standard for that particular location.

The portable test instrument is able to bring up on its screen a sequential display of cable identifications, or I.D.'s. The portable test instrument also stores a test routine including a number of separate testing regimens which may be activated selectively. When the tradesman connects the test instrument to a particular cable, matches it with the cable I.D. then displayed on the display screen of the instrument, and pushes the "Test" button on the instrument, the correct test regimen for that cable is then generated by the test instrument in accordance with the database plan. In some instances the test instrument may make only basic tests such as for continuity or short-circuit. This specifically defined procedure saves time and money. A test may be made on one particular cable employing all of the available test regimens or routines, while a test made on another cable may use less than all of them.

ON-SITE SIGNAL THROUGHPUT TESTING. A remote termination unit which may be connected to the remote end of a cable or line being tested is normally passive, but is selectively activated under control of the portable test instrument by a control signal sent through the cable being tested so that it then becomes an intelligent device for testing signal response and/or throughput. According to our invention a standard Gigabit Ethernet Transceiver is contained within the portable test instrument, and a compatible one is also contained within the remote intelligent terminal. When line performance is being tested for its ability to respond to or throughput any kind of signal the remote termination unit is then activated by a control signal from the portable test instrument. Such tests may include SKEW, which determines when excessive delay is found on the wire pairs; a signal-to-noise ratio test (SNR) for acceptable noise levels in a prescribed band of frequencies corresponding to the cable specification in the plan; and a data flow rate that has a bit error rate (BERT) held within an acceptable error level. Test results at each location are then compared by the instrument internally against the plan requirements for each cable, which had already been stored in the instrument.

REPORTING AND ARCHIVING. A summary of test result data and results of the comparisons are stored in the portable test instrument before being uploaded back to the computer. When the completed test result data are uploaded from the portable test instrument back into the computer, they may also be accompanied by a re-copying of the plan information back into the computer. After test results have been uploaded to the computer, the computer is utilized to print out both the plan information and the results of the comparison tests. To completely fulfill any present or future business purpose, the computer is then used to print a final report, and/or to print an invoice to the customer, and/or to create an archive of the installation and test results for future use.

DRAWING SUMMARY

FIG. 8 is a drawing of a screen display on the screen of the portable test instrument showing a list of the selected cables and the results prior to instrument pass/fail tests that will be made on each.

Figure 1:
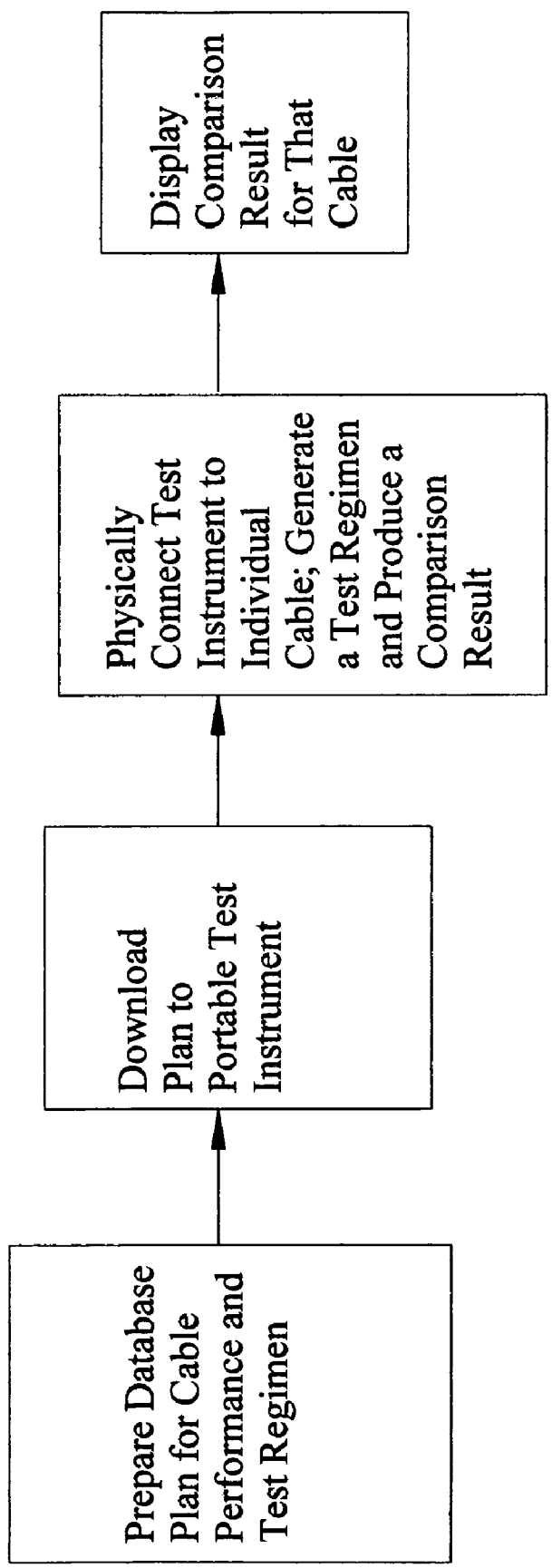
FIG. 1 is a schematic drawing in the nature of a flow chart illustrating the method of the present invention in the planning, installing, and testing of a single cable.

DESCRIPTION OF GENERAL FORM OF THE INVENTION (Drawing FIG. 1)

For one particular cable as shown in FIG. 1, both the cable performance requirements and a selection of the tests to be made on it are prepared in a computer, and are then concurrently transferred into a portable test instrument. The test instrument is capable of generating several different test regimens, each of which includes a number of individual testing steps. For each cable the test instrument is activated to select the particular test regimen to be used for that cable, compare acquired test information to the previously established performance requirements for that cable, and then display the result of the comparison.

DESCRIPTION OF PREFERRED EMBODIMENT (Drawing FIGS. 2 through 9)

Figure 9:
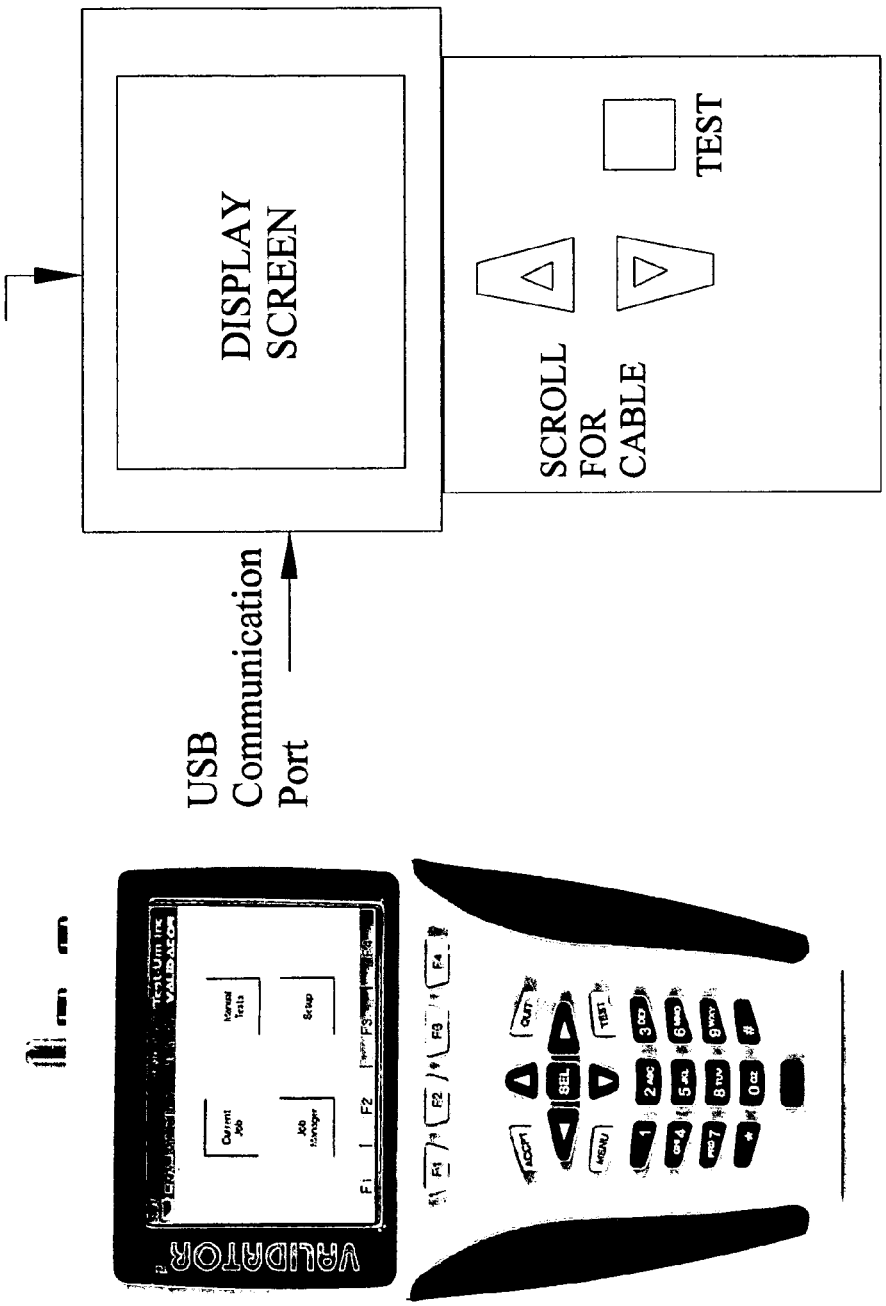
FIG. 9 is a photo of the hand-held portable test instrument, together with a schematic representation of its most important operative parts.

According to the present invention a comprehensive method is provided for planning, installing, and verifying a set of electrical cables in a building. A personal computer is used for creating a computer database model of the proposed installation. The Plan-Um software is installed on a personal computer which is typically located where design engineering planning can be carefully and correctly done. By utilizing the computer, and known layout tools, a database model of the proposed installation including a simulated floor plan is developed. From a menu, the user selects the type of room that he would like to place on the drawing. The completed database plan then includes port locations, corresponding cables to terminate at those port locations, selection of specific cable types, designations of the cable types, and an indication of the desired performance characteristics for each individual cable when installed at its respective locations. The cable types may include coax, phone, audio, security, and data cables with different performance characteristics. As part of the layout procedure, a listing of the selected cables is automatically created by the computer. In utilizing the computer, and known layout tools, the database model developed for the proposed installation plan includes not only port locations and their corresponding cables to terminate at those port locations, but also a definition of the specific type and desired performance characteristics for each of the selected individual cables. As each part of the layout procedure progresses, a listing of the selected cables is also automatically created by the computer and also automatically supplemented as the plan is developed. In the preferred method, the floor layout and the cable definitions are created in separate computer files. Once completed, both the plan information and the cable definitions are then concurrently copied or downloaded from the computer into the portable test instrument through a universal serial bus (USB) connection as shown in FIG. 9.

Figure 2:
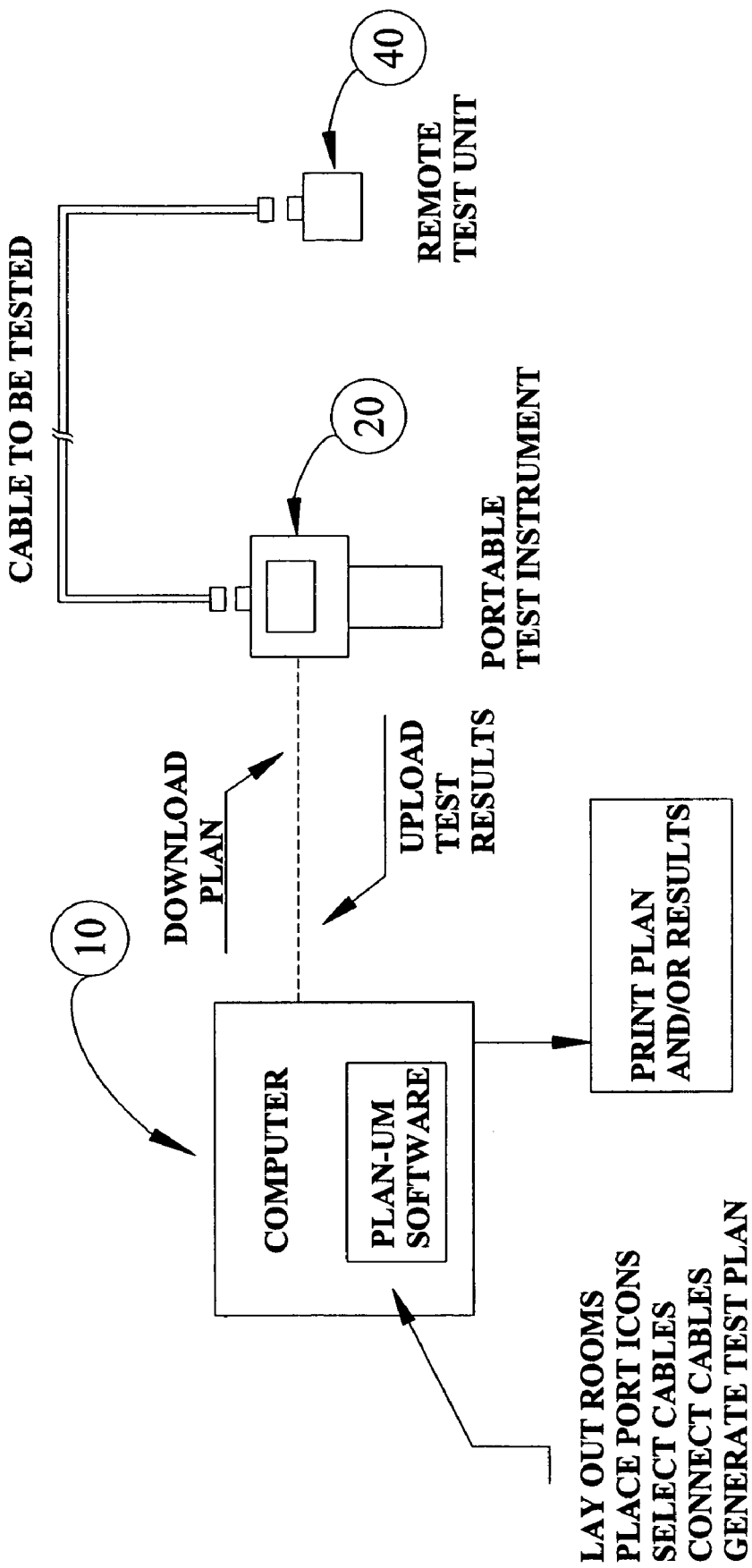
FIG. 2 is a schematic block diagram of the complete instrument system utilizing in carrying out the novel method of the present invention.
Figure 4:
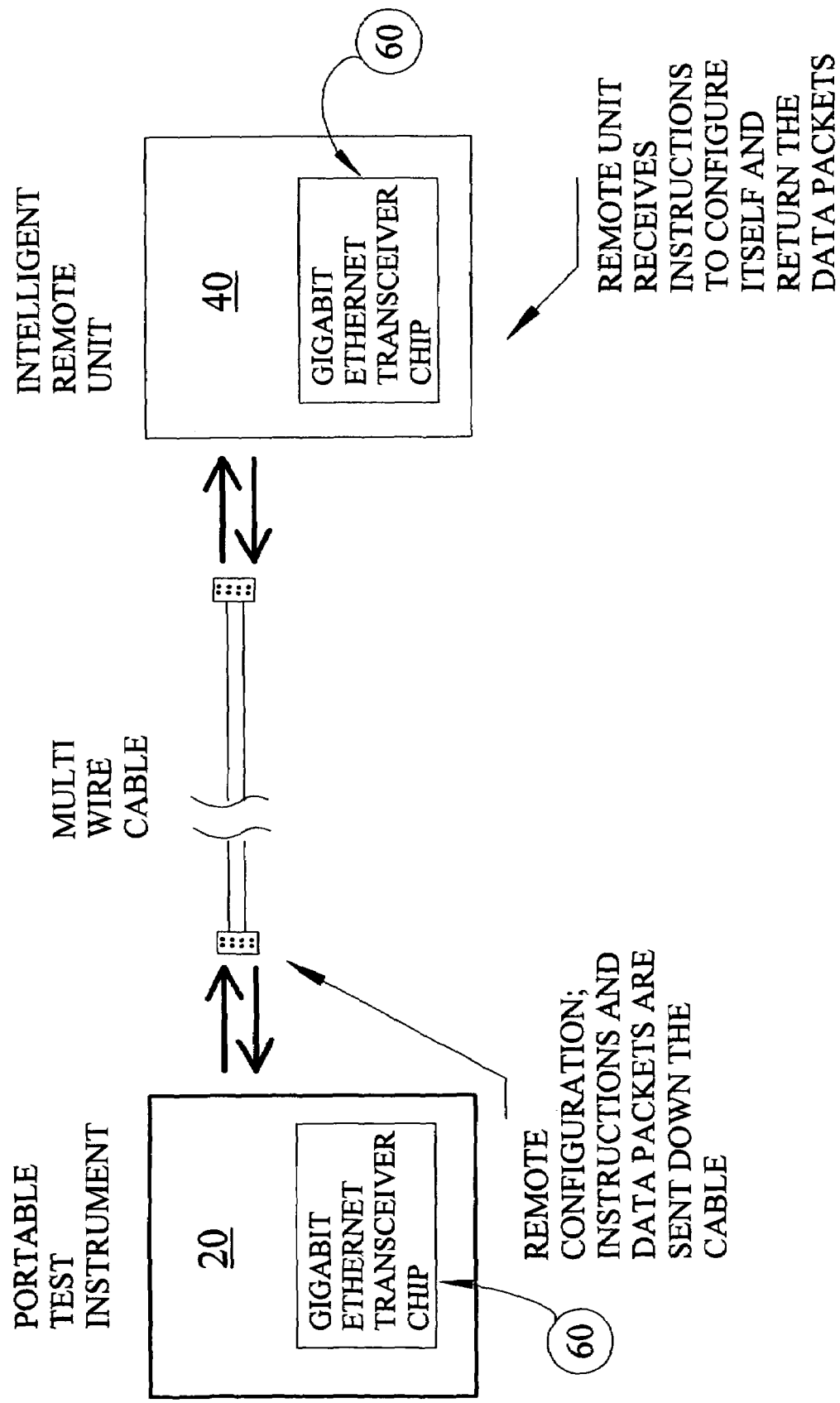
FIG. 4 is a schematic drawing, primarily in the nature of a flow chart, illustrating the communication path between the portable test instrument and an intelligent remote unit, in carrying out the method of the present invention.
Figure 5A:
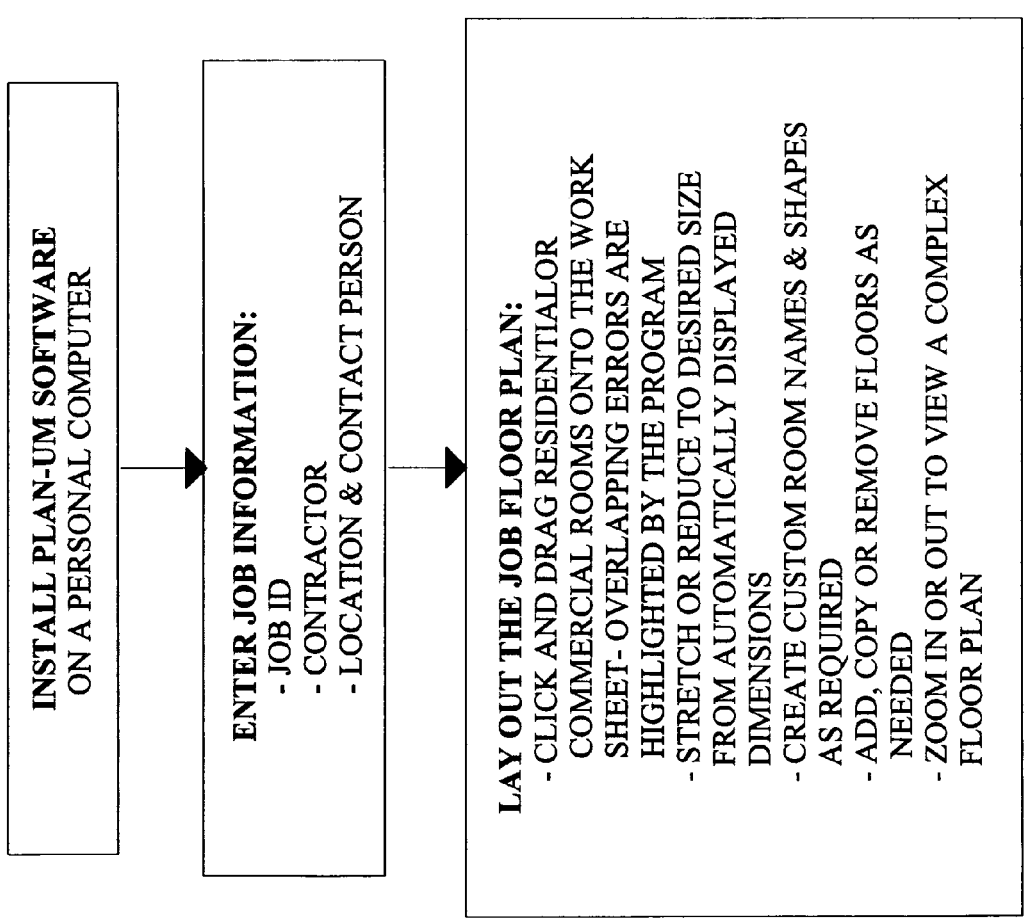
FIGS. 5A, 5B, 5C, 5D and 5E are a flow chart illustrating the sequence of steps in accordance with the presently preferred form of our new method.
Figure 5B:
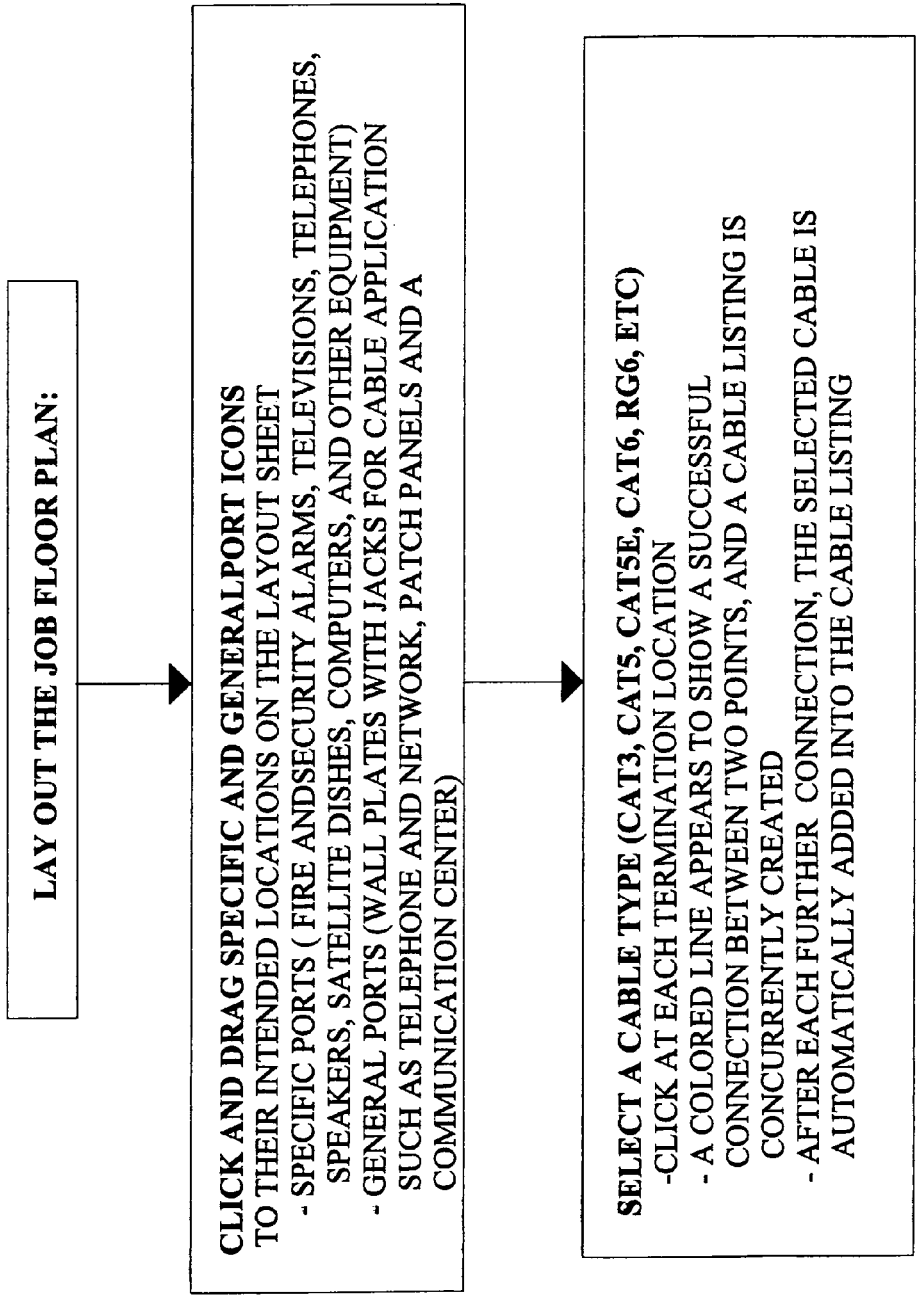
Figure 5C:
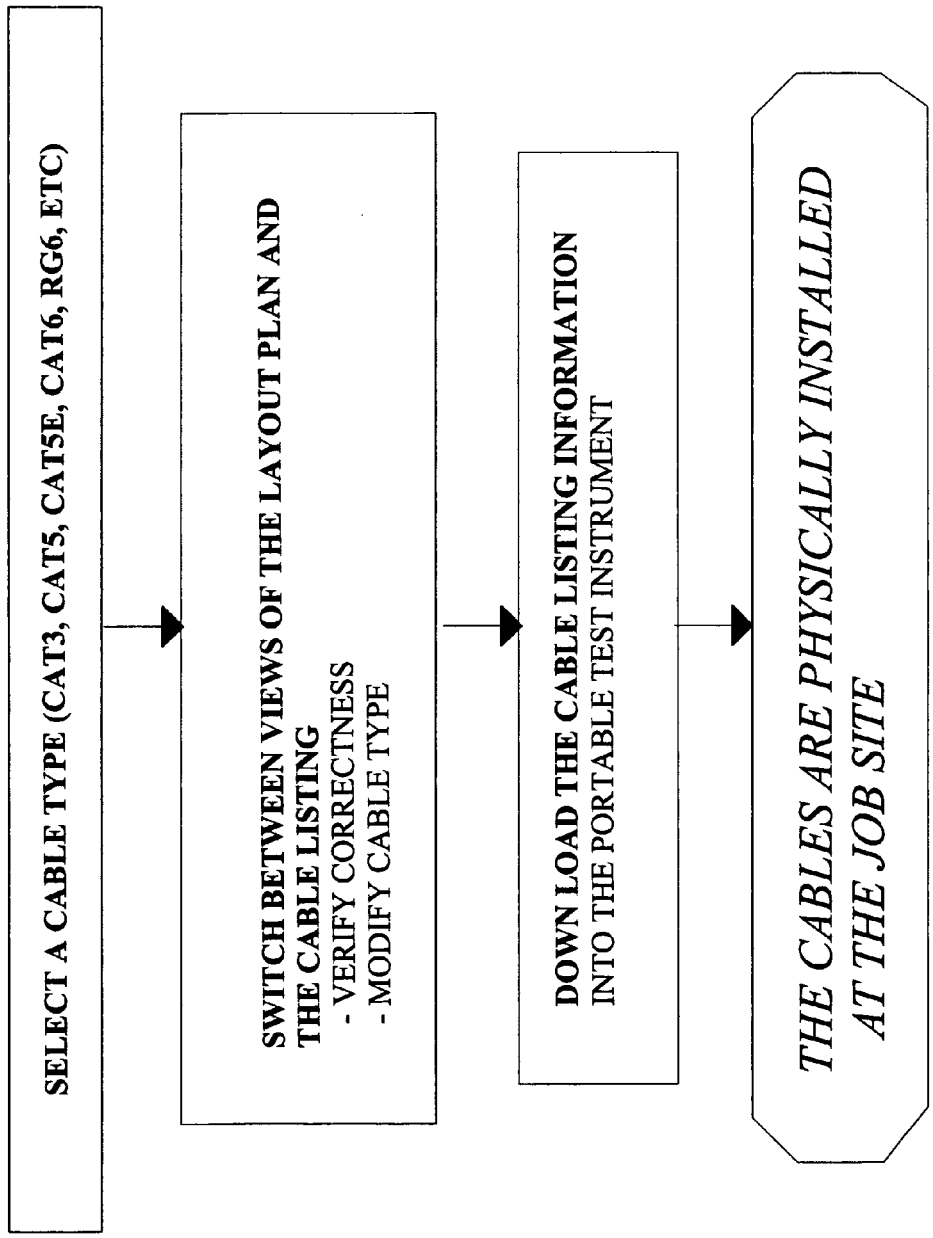
Figure 5D:
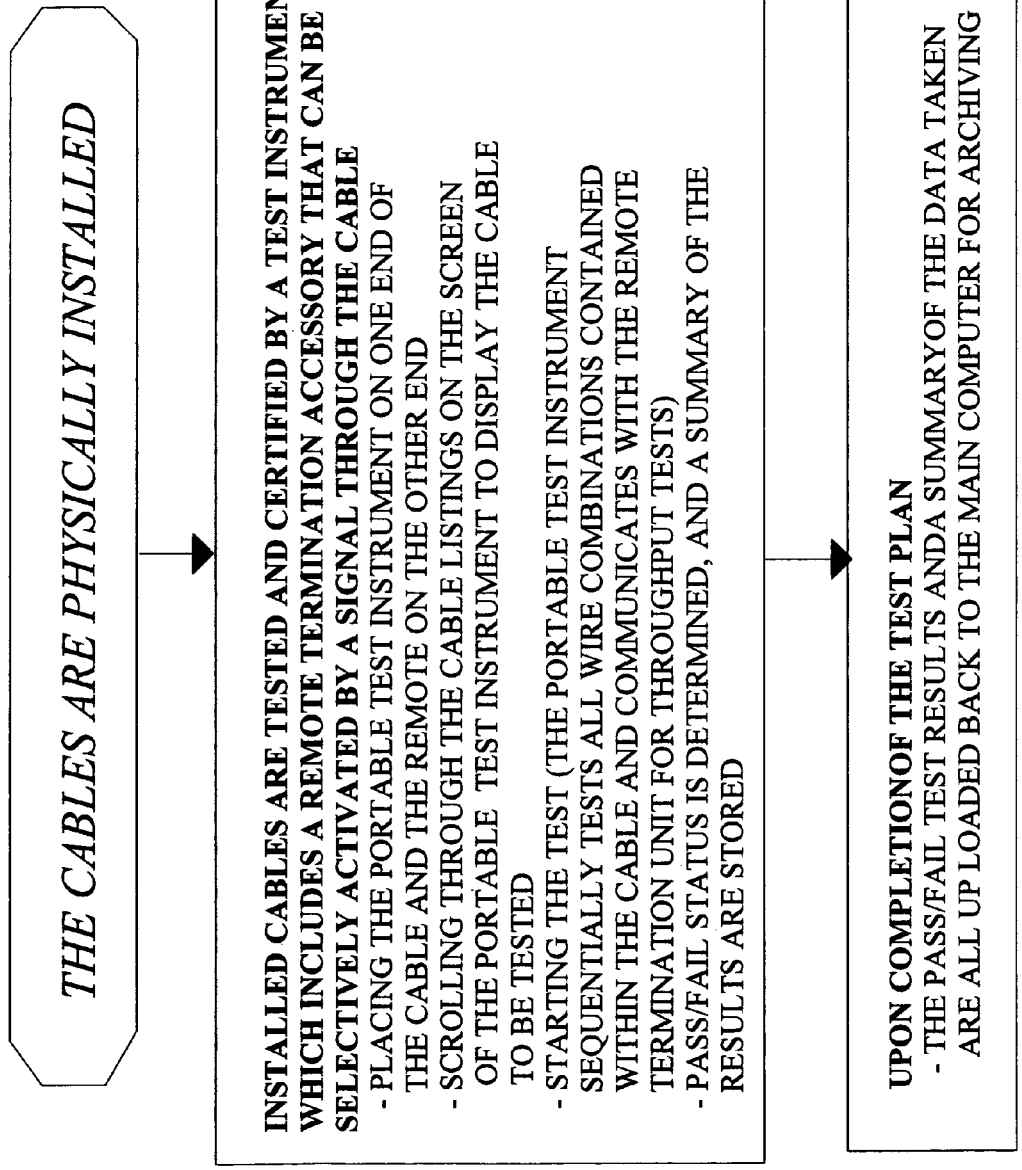
Figure 5E:
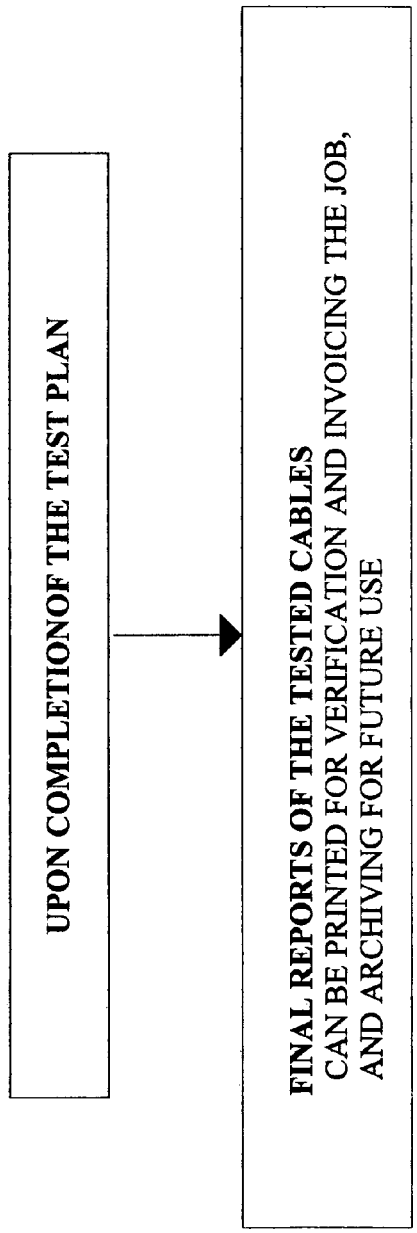
Figure 6:
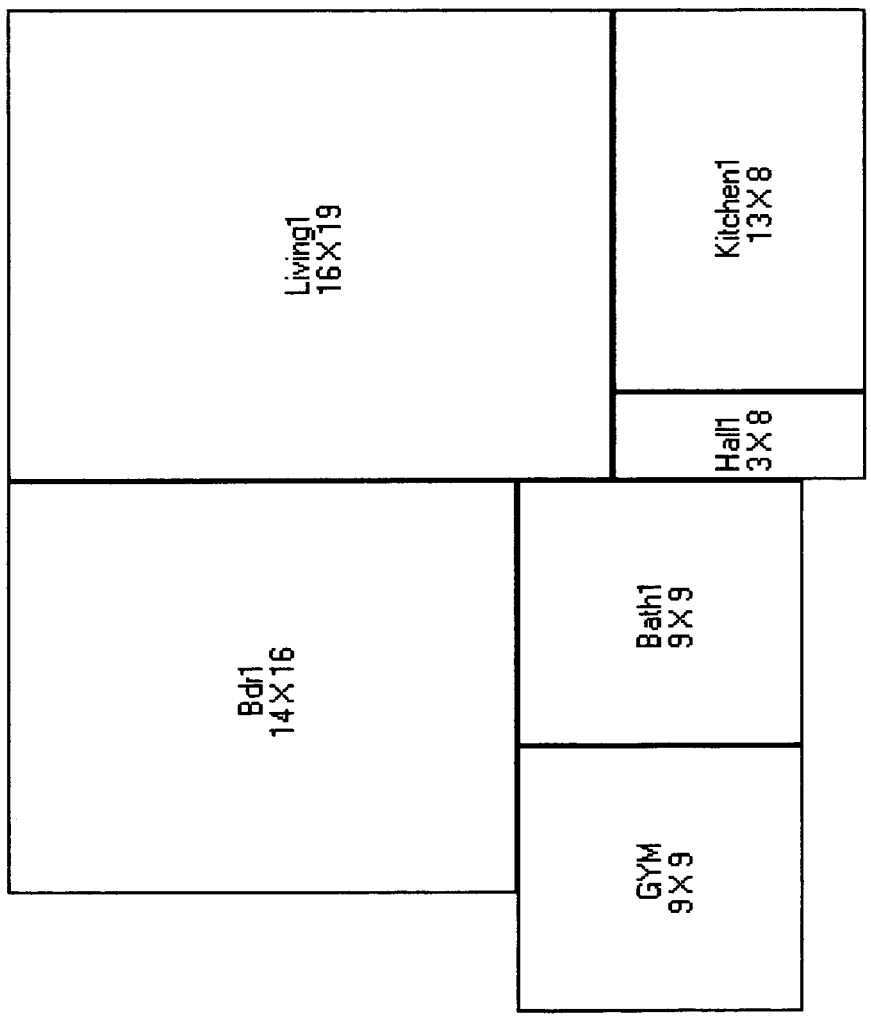
FIG. 6 is a drawing of a floor arrangement in a building in which a cable system is to be installed, as it would be displayed on the computer screen.
Figure 7:
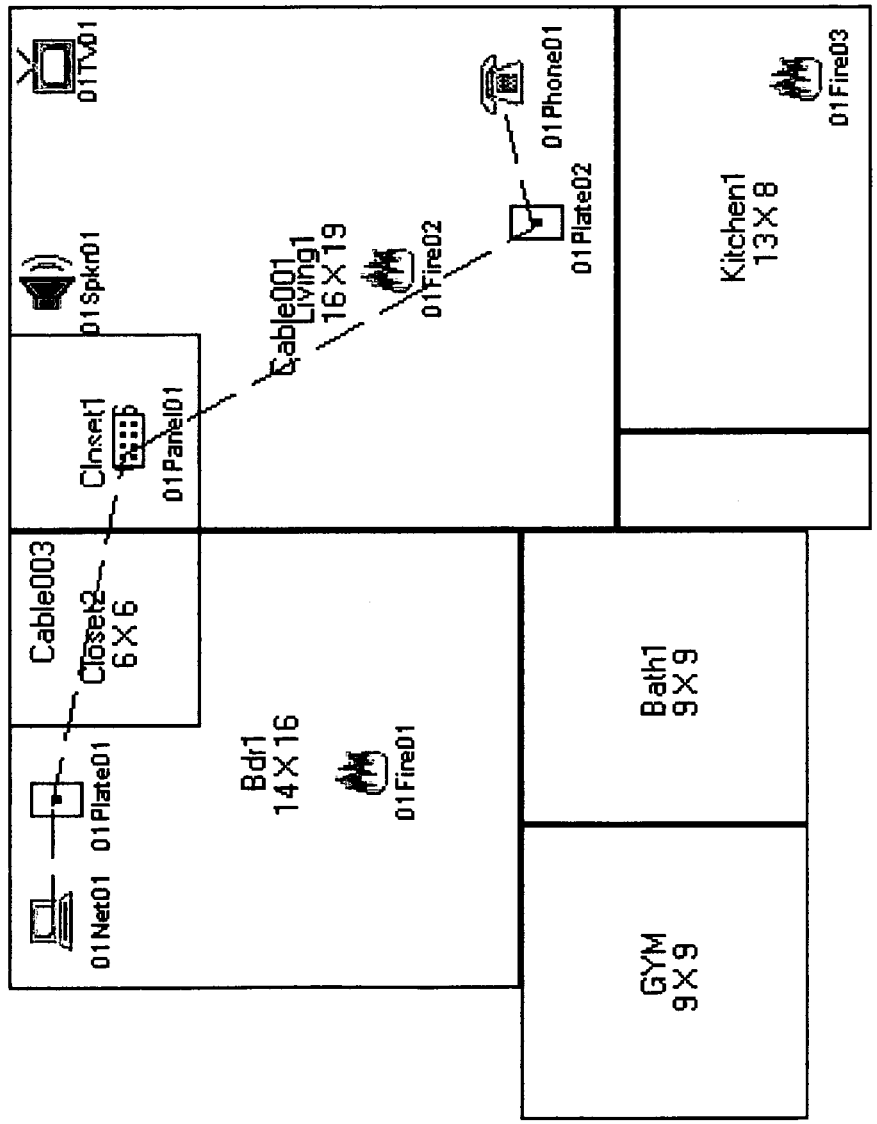
FIG. 7 shows the computer screen display of FIG. 6 after port locations for cable connections and the cable selections have been assigned.

As shown in FIGS. 2 and 4, the complete instrument system includes a computer 10, a main portable test unit 20 that is connected to the near end of a cable or line being tested, and a remote termination unit 40 that may be connected to its remote end. Computer 10, portable test instrument 20, and intelligent remote unit 40 are used in a cooperative manner to plan, install, and verify an electrical cable system in a building. A floor plan for the building is created and displayed on the screen of computer 10. Selecting from various menus of choice, port locations are chosen by the operator, and are strategically dragged by a mouse to their intended locations on the drawing. Icons are used to visually depict the category of the selected port (phone, TV, data, etc.). In a like manner, cable selections are made. The mouse is used to identify the port at which a cable starts, and where it ends. Dashed or colored lines may indicate the "from - to" electrical connection. Thus, a listing is made of specified port locations and of the corresponding cables to be terminating at those locations, and that listing is saved into the computer 10.

As the installation plan is graphically defined, a test listing is now also currently derived. There are in fact several different ways for designating or identifying a particular cable. For example, it could be Cable No. 131 for the particular job site. Also, it could have an industry standard designation such as RG-58, CAT3, or CAT5. Furthermore, a particular cable might have a model number or lot number, or both, assigned by its manufacturer. In many instances a particular designation will have a known performance standard for that cable associated with it. But in accordance the planner has the opportunity to specify a different performance standard, other than the standard that might normally be associated with that cable. While preparing the test plan the installation planner can switch between views of the building layout plan and the cable listing information. Once they are complete, the layout drawing and associated test regimen plans are stored in computer 10.

The plan information as stored in the portable test instrument provides sufficient detail so that testing may be done at each separate location, which verifies the desired performance characteristics of each cable terminating at that location. Thus, the scope of testing done at each location may be restricted to requirements applicable to that particular location.

According to the method of the present invention, in addition to the personal computer used for creating a database model of the proposed installation, the portable test instrument that is utilized has information processing capabilities that are compatible with the computer. The portable test instrument through its USB port can both receive data from the computer and transfer data back into the computer. The computer and the portable test instrument are operated in a cooperative manner to effectively plan, install, test, and verify the proposed installation, and then subsequently to provide reports and/or archival storage for business purposes.

The completed plan information downloaded into the portable test instrument includes not only the manufacturer's or other identification of a cable type for each location, but also an indication of the performance characteristics desired for that individual cable when installed at its respective location, and a test regimen to verify performance. The portable test instrument is capable of generating a test routine which includes a predetermined number of separate testing steps in sequence. When the operator matches a physical cable with the corresponding one shown on the display screen of the portable test instrument, and pushes a "Test" button, the instrument then automatically generates the test routine for the particular test regimen that is needed to verify correct performance of that cable for that location.

Figure 3:
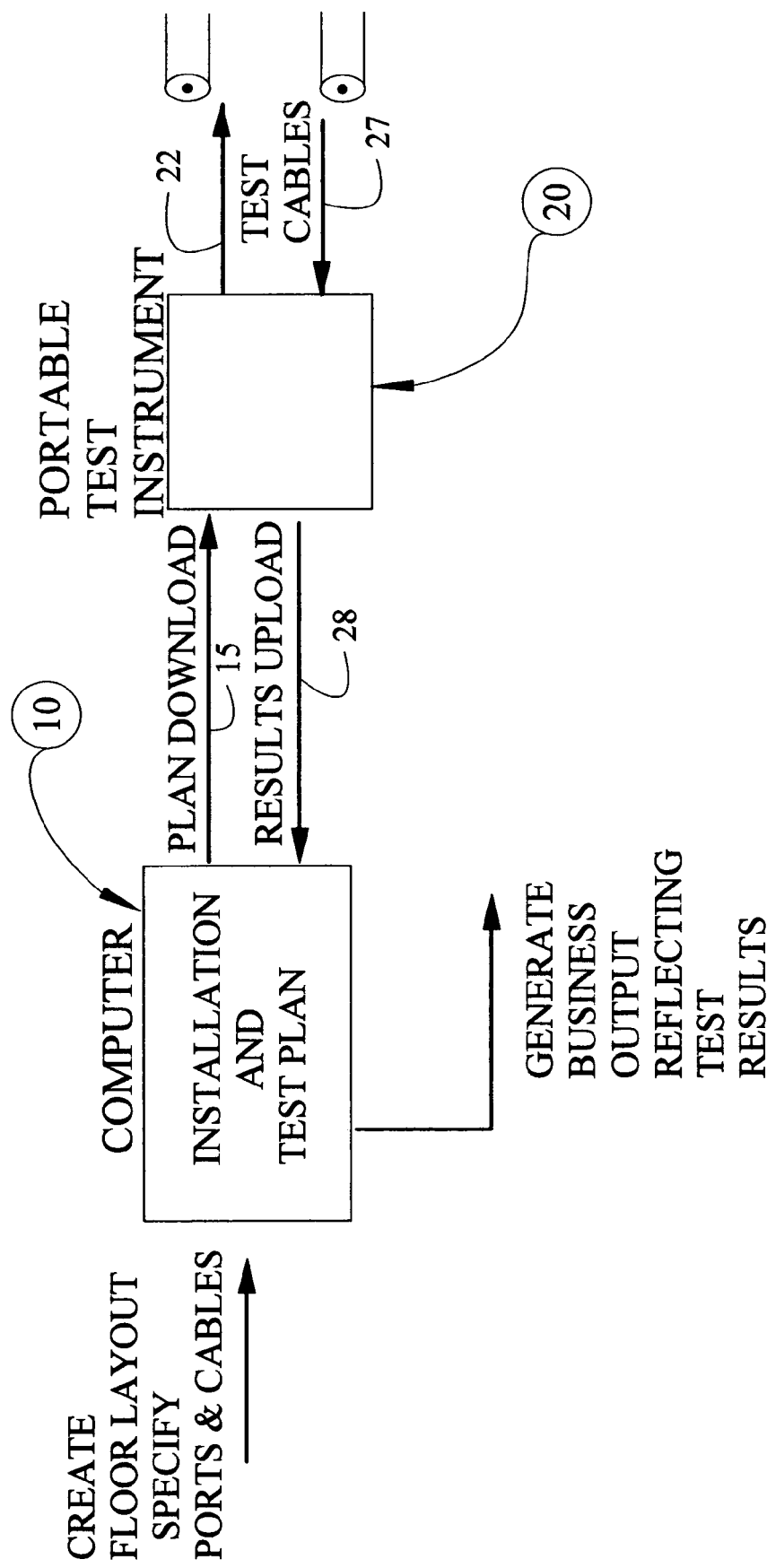
FIG. 3 is a schematic drawing, primarily in the nature of a flow chart, illustrating the cooperative operation of the computer and a portable test instrument in carrying out the method of the present invention.

Arrow 15 in FIG. 3 indicates that the derived installation and test plan will be downloaded or copied from computer 10 into portable test instrument 20. The technician will then physically carry the test instrument, with plans loaded in it, to the job site where he or she will perform actual cable installations. The test instrument preferably includes a visual display means or screen that is available to display the identifications of individual cables as they are being installed. A hard paper computer printout of the installation plan may also be used to facilitate the actual construction process.

Upon completion of the actual physical installation of the cables the installer or test technician takes the test instrument to the job site. He pushes a button to open the installation plan appropriate for the job site. Site specific information is then displayed on the screen of the instrument. Selecting the "cable test schedule" button, the user can scroll through a display of all the individual cable runs as defined in the plan. When the operator matches a physical cable with the corresponding one shown on the display screen of the portable test instrument, and pushes a "Test" button, the instrument then automatically generates the test routine needed to verify correctness of that cable for that location.

A screen on the portable test instrument (FIG. 8) is used to display information sufficient to guide the work of the installer. However, because of the relatively small size of the portable instrument, it may be desirable to also have a hard-copy printout of the plan made from the computer for facilitating the on-site physical installation of the cables. When the installation is completed or as it is progressing, the test instrument system is utilized at the job site to test the various individual cables. An advantageous feature of this method is that a test person does not need to be highly trained to evaluate a cable's performance.

The next step as indicated by arrow 22 in FIG. 3 is to perform tests on the individual cables. The instrument 20 is moved from one cable or port location to another. At each location the technician or operator matches the cable I.D. shown on the instrument screen with a physical cable to which the instrument is connected. He selects from the stored test routines the test regimen to be performed at that particular location for that particular cable, and instructs the instrument accordingly, typically by pushing the "Test" button on the instrument.

The test instrument is provided with electronic means to visually display the test results. It also stores a program to compare the result of applying the selected test regimen for each cable with the desired performance characteristic for that cable. The test information for each cable is compared by the instrument with plan requirements for that cable, and the result of the comparison is stored in the instrument, as indicated by arrow 27 in FIG. 3. A pass/fail type of comparison output is preferred.

Some testing steps will require active operation of the remote unit, but some will not. A Gigabit Ethernet Transceiver chip 60 is contained within the portable test instrument 20, and another and compatible Gigabit Ethernet Transceiver chip 60 is also contained within the intelligent remote unit 40. Whenever the line performance is being tested for its ability to respond to or throughout any kind of signal, the remote termination unit 40 is activated by a control signal sent through the cable from the hand-held portable test instrument 20. The Gigabit chip 60 may, for example, be of the type True PHY ET1011 manufactured by Agere Systems, Inc.

For each port location a decision had to be made as to the performance test to be made for each cable connected at that location. Those decisions, however, are not made on-site by the tradesman or installer. Those decisions are made in advance during the planning process, and on the job site are automatically carried out by the portable test instrument. Two cables bearing the same industry standard or manufacturer's designation may be intended for two different locations in the building, and their performance requirements may differ. Our plan puts information into the portable test instrument to identify the performance that is required for each individual cable at each particular location, so the very same cable type when located in two different places may be tested by differently selected test regimens.

According to our invention the portable test instrument is made capable of generating a test routine which includes a predetermined number of test regimens, each of which includes separate testing steps in sequence. Performance standards for two or more different cables are therefore stored in the portable instrument at the same time. A test may be made on one cable employing all the predetermined number of test steps—i.e. the most complex test regimen—while a test is made on another cable using a less complex regimen with less than all of the available test steps. The portable test instrument is preferably programmed to first make the basic tests such as for continuity or short-circuit before going on to more advanced tests.

The method of the present invention particularly applies to testing individual cables. An important advantage of the invention is that the responsible owner or contractor may not need to perform incoming tests on all cables before they are selected for the job. The manufacturer's specifications can be relied upon preliminarily, at least until after the actual installation is made. Each cable is then tested only after being placed in its operative location. The cable is tested to meet the performance standard needed for its intended use in the very location where it has been installed. This more specifically defined test procedure saves time and money. Although it may not strictly comply with the ISO or IEEE standards, it does meet performance standards for the job the cable will be required to do.

The method of the present invention particularly applies to the testing of individual cables, irrespective of whether or not they are intended to be subsequently connected as part of a network. According to the presently preferred form of the invention the plan information as stored in the portable test instrument provides sufficiently specific cable detail so that the testing may be done at each separate location, which verifies exactly the expected performance for each cable terminating at that location. In the physical installation there needs to be at each port a label or some other form of identification for each cable end that is to terminate there. When the operator connects the portable test instrument to the cable end, if the cable I.D. as then displayed on the screen of the portable instrument matches the physical I.D. of the installed cable, the operator is assured of making the correct test on that cable as specified in the plan.

Our invention does not purport to provide a method of cable certification as such. On the contrary, we provide an alternative process which is economically advantageous. We ensure that each individual cable, if later connected into a network, has at least a 99% chance of working as desired in that network. We do this by testing each cable for performance in its installed location for the performance needed in that location.

An important feature of the invention is that the tests made on each cable are not the entire comprehensive standard tests established by the industry such as the TIA568 for Ethernet cable. In some instances the cable specified may not even be a standard cable but may have been customized for the particular installation. Application-specific tests for the specific type of cable are made according to performance requirements of the plan at that location. The cable performance is tested for specific things such as: data flow that has a bit error rate (BERT) held within an acceptable error level; SKEW, which determines when excessive delay is found on the wire pairs; and a signal-to-noise ratio test (SNR) that is at acceptable levels in a prescribed band of frequencies corresponding to the given cable specification. Test results at each location are then compared by the instrument internally against the plan requirements for each cable at that location, which had previously been stored in the instrument.

Tests made by the portable test instrument from only the input end of the line being tested may include length of cable (time domain reflectrometry, TDR) distance to opens and shorts, and the length of a cable as shown in U.S. Pat. No. 6,646,454 B2. The near end tests may also cover possible mispairing of pairs inside a cable, including all combinations on all pairs, as disclosed in U.S. Pat. No. 6,002,247. When line performance is being tested for its ability to respond to or throughput any kind of signal, such as SKEW, channel response, or echo testing, in accordance with the present invention the remote termination unit is then activated by a control signal sent on that line from the portable test instrument.

One very important performance test is for the information flow rate. One portion of the test made on each cable is to generate from the portable test instrument a bit stream at the data flow rate desired for the cable performance. The remote unit, when activated, can return a data stream back to the portable test instrument. The portable tester has the processing capability to both transmit real data through the cable, and to make a comparison against the returned data to determine if errors had occurred. For example, the desired bit rate might be one hundred megabits per second or one Gigabit (1000 Megabits). Random data packets are sent down the cable. An input bit stream as received by the remote terminal unit is then automatically fed back to the cable input end, and circuitry within the portable unit makes a comparison and a determination as to whether the error rate is acceptable under a predetermined standard. This process of error checking is well known in computer technology. However, a test of bit rate alone would probably not provide a margin of comfort as to the true capacity of the line.

In making the test for data flow rate with an acceptable bit error rate (BERT) the Gigabit Ethernet Transceiver 60 in intelligent remote unit 40 comes into operation. When activated by a control signal from the main portable test unit 20 it generates appropriate signals that are sent back through the line to the main test unit. There the return signals are analyzed and interpreted by the Gigabit Ethernet Transceiver chip 60 in the main test unit 20.

Another important test is for signal-to-noise ratio. It is known, for example, that noise signals below a frequency of 30 Mhz are a major detriment to sending data at high speed over 100 Mbit or one Gigabit Ethernet lines. Noise of all types and sources is the biggest single roadblock to achieving high data transmission speeds. In our method we therefore test the signal-to-noise ratio of signals that are throughput to the remote unit 40 at selected frequencies within a predetermined frequency band. Portable test instrument 20 contains circuitry that determines, from the response of remote unit 40 to the transmitted signals, the level of the signal-to-noise ratio for the operation of the cable at that signal frequency. At least one signal frequency that is used in this test is appropriate to determine the magnitude of noise signals below a frequency of 30 Mhz, which as stated above are a major detriment to sending data at high speed over 100 Mbit or Megabit Ethernet lines.

The test signals sent through the line or cable may include both bit rate data streams and analog frequency signals within predetermined frequency bands. Cable performance is measured separately for each parameter. By giving the customer proper tests against the parameters that are set by specification IEEE 802.3, for example, we can give the customer a clearer real world indication of the capability of the cable run being tested.

The magnitude of noise signals below a frequency of 30 Mhz is a major detriment to sending data at high speed over 100 Mbit Ethernet lines. In our novel method we therefore test the signal-to-noise ratio of signals that are throughput to the remote unit. Utilizing proprietary software and firmware, we extract a statistically verified noise level equivalent from the Gigabit Ethernet Transceiver chip employed in the portable test instrument (Validator). The accuracy of SNR levels as determined by a Gigabit Ethernet Transceiver chip have been independently verified and are recognized within the industry to achieve a high correlation with traditional methods. By utilizing this to our advantage, we are able to accurately test SNR in cables while avoiding the costly frequency-sweep method used in traditional certifiers. This approach is also superior in that it looks at all four pairs of an eight-wire cable simultaneously, when testing at the Gigabit rate.

Real-time testing of performance capability of the cable in actual link environments can measure signal quality that will account for cable inadequacies. The result of each test is typically a pass-fail report. The tests may establish compliance with TIA 568/570 interconnect standards, or that cable types CAT5, CAT5E, or CAT6 are compliant with IEEE standards to 1 gigabit speed.

A summary of test result data and results of the comparisons is stored in the portable test instrument before being uploaded back to the computer. See FIG. 8. When the completed test result data are uploaded from the portable test instrument back into the computer, they may also be accompanied by a re-copying of the plan information back into the computer.

Thus according to one feature of the invention a computer is utilized to prepare a test plan that includes both a performance standard for a particular cable to be installed at a particular location and a selection of tests to be made against that standard. Both the test selection plan and a comparison routine are then stored in a portable test instrument. After the cable is installed the portable test instrument is connected to the electrical cable and actuated to both apply the test routine to the electrical cable and activate the comparison routine. The comparison routine compares the results of the cable test with the performance standard and generates the result of the comparison of the test information to the performance standard for that cable at that location.

According to another feature of our invention a portable test instrument is utilized that is capable of generating a test routine which includes a predetermined number of separate testing steps in sequence; the performance standards for two or more cables are stored in the portable instrument at the same time as different test regimens; and a test may be made on one cable employing all the predetermined number of test steps while a test is made on another cable using less than all of the available test steps.

CABLE VALIDATION. In the cable industry, and particularly when dealing with high-speed data cables, there is an industry standard process known as "Certification". This involves testing the individual cable against an industry standard, such as TIA 568. Traditional certifiers are all built to test an individual cable through a broad range of frequencies and other measurements associated with the specifications set down under TIA 568. But even the standard process of certification cannot provide a 100% certainty that the cable after being connected into a network will perform as desired. The present invention does not purport to provide a method of cable certification. On the contrary, we provide a different process which is an economically advantageous alternative, and which we designate as "VALIDATION". In the validation process we ensure that the particular individual cable, when later connected into a network, has at least a 99% chance of working as desired in that network. We are able to do this without the necessity of testing each individual cable against a theoretical general standard. Instead, we test it for performance in the manner in which it is intended to be used in a specific installation plan. Thus, our validation process is not an abstract stand-alone process. It is done in conjunction with the cable in its position of use and for a specific intended use for the cable being tested. Thus our terminology "Validation" means something that is significantly different from the industry term of "certification".

TERMINOLOGY. We use terms such as "Validator" or "Validation" or "Network Cabling Certifier" to describe our method or process. These terms are not intended to represent the industry standard process known as "Certification".

The plan information flows around a circular path, going first to the portable test instrument 20, then through the testing procedure, then back to the computer 10 where it had originated but accompanied by the test result information, and then it goes to archiving and/or report printing for a business purpose. After all the tests have been completed, the technician again places the test instrument 20 in communication with computer 10, and the comparison test results are uploaded from the test instrument back into the computer. This information transfer may also include a copy of the layout plan as originally provided to the test instrument system, plus changes made on the test instrument for adds, changes, deletions, and/or corrections.

Tests of the performance of the installed cable are made by applying selected signals from the portable test instrument 20 through the cable to the remote test unit 40. These test signals include both bit rate data streams and analog frequency signals within predetermined frequency bands. The cable performance is measured separately for each. One very important performance test is for the information flow rate, as for example, one hundred or one thousand megabits per second. The remote unit when activated then sends the bit stream back to the portable test instrument 20, which has the capability to make a comparison and determine if there was an excessive error rate. One portion of the test made on each cable is to generate from the portable test instrument 20 a bit stream at the data flow rate desired for the cable performance. The bit stream as received by the remote terminal unit 40 is then automatically fed back to the cable input end, and circuitry within the portable unit 20 makes a comparison, and a determination as to whether the error rate is acceptable under a predetermined standard. This process of error checking is well known in the computer technology.

The available test routines as stored in the portable test instrument preferably include quite a number of testing steps, which may be automatically be activated in a predetermined sequence. However, not all of the testing steps are used for every cable. We therefore arrange the sequence of testing steps by putting first those that are always used, such as tests for continuity and short circuit. Then the more sophisticated tests are arranged later in the sequence. For a particular cable, only as many of the test steps are activated as are required to measure the performance of that cable against its individual performance standard.

Thereafter, as a final step of the process after test results have been uploaded to the computer, the computer is utilized to print out for a business purpose both the plan information and the comparison test results. The business purpose may be to print a final report, and/or print an invoice to the customer, and/or create an archive of the installation and test results for future use.

OPERATION OF THE PORTABLE TEST INSTRUMENT. Thus according to the present invention the method of testing electrical cables installed in a building is accomplished as follows. A hand-held portable test instrument is selected having a data input, a display screen, a connection port for connecting to an end of a cable, cable selections keys, and a test actuation key. A comparison routine for comparing test results with a performance specification and a plurality of test regimens of differing complexity are loaded into the instrument. There is also loaded into the test instrument a plan database that specifies a plurality of cables, port locations where each of the cables is to be connected, desired performance characteristics for the respective cables, and test regimens for the respective cables. The instrument is then physically connected by its connection port to an end of a particular cable which is to be tested. The cable selection keys are operated until a listing of the same cable appears on the display screen. The operator then actuates the test actuation key so that in accordance with the database plan the test regimen for that cable is generated by the instrument and applied to that cable, and the instrument then compares the test results with the performance specification for that cable. The results of the comparison for that cable are then stored in the instrument, and a pass/fail type of comparison output is produced on the screen.

Other modifications of our method will be apparent to those persons skilled in the art. The scope of our invention is to be judged only in accordance with the appended claims.

What we claim is:

1. A method of managing the installation of an electrical cable in a building, comprising the steps of:

creating a computer database indicating the type of cable, the desired performance characteristics the cable should have after it has been installed, and a test regimen that would be needed to verify those performance characteristics, wherein the computer database is created with the same information for each of a plurality of cables, separately indicating desired performance characteristics for each of the corresponding cables, and also indicating a test regimen that would be needed for each cable to verify its desired performance characteristics; transferring the database into a portable test instrument; and positioning the test instrument with the database contained therein at the building site.

2. A method of managing the installation of an electrical cable in a building, comprising the steps of:

creating a computer database indicating the type of cable, the location where the cable is to be installed, the desired performance characteristics it should have after it has been installed in that location, and a test regimen that would be needed to verify those performance characteristics, wherein the computer database is created with the same kind of information for each of a plurality of cables, separately indicating desired performance characteristics for each cable, including a test regimen for each cable to verify its desired performance characteristics; transferring the database into a portable test instrument, wherein the portable test instrument is selected to have the capability of generating any selected one of a plurality of test regimes; and positioning the test instrument with the database contained therein in the building site at that location.

3. A method of managing the installation of electrical cables in a building and of testing electrical cables after they have been installed in a building, comprising the steps of: (a) creating a computer database that includes a list of cables, the port locations where each of the cables is to be connected, desired performance characteristics for the respective cables, and test regimens required for the respective cables; (b) selecting a handheld portable test instrument having a data input, a display screen, a connection port for connecting to an end of a cable, cable selections keys, and a test actuation key; (c) loading into the test instrument a plurality of test regimens of differing complexity, and a comparison routine for comparing the results of a test regimen with a performance specification; (d) loading the database into the test instrument; (e) positioning the test instrument with the database contained therein in the building site at the location of a particular cable; (f) physically connecting the connection port of the test instrument to one end of the cable; (g) operating the cable selection keys of the test instrument to scroll the cable list until the identification of the same cable appears on the display screen; and (h) then actuating the test actuation key so that in accordance with the database the test regimen for that cable will be generated by the test instrument and applied to that cable, and the test instrument will then compare the test results for that cable with the performance specification for that cable.

4. The method of claim 3 wherein an intelligent remote terminal is also connected to the other end of the same cable, prior to actuating the test actuation key.

5. A method of planning and installing two different electrical cables at respectively different locations in the same building and after their installation testing their performance, comprising the steps of: (a) creating a computer database indicating, for the two cables, the types of cables, the locations where they are to be installed, the desired performance characteristics they should have after they have been installed in those locations, and test regimens that would be needed to verify those performance characteristics; (b) selecting a portable test instrument that is capable of generating a test routine that includes a predetermined number of separate testing steps in sequence; (c) preparing for one of the cables a performance standard in electronic data form which requires a test routine of less than that predetermined number of steps; (d) preparing for the other cable a performance standard in electronic data form which requires a test routine including all of that predetermined number of testing steps; (e) storing the electronic data for both of the performance standards concurrently in the portable test instrument; (f) transferring the database into the portable test instrument; (g) positioning the portable test instrument with the database contained therein in the building site at the location of one cable; (h) physically connecting the test instrument to one cable and then actuating it to test that cable according to its respective test routine; and (i) then physically connecting the test instrument to the other cable and actuating the test instrument to test the other cable according to its respective test routine.

6. A method of managing the installation of an electrical cable in a building, comprising the steps of: (a) creating a computer database indicating the type of cable, the desired performance characteristics the cable should have after it has been installed, and a test regimen that would be needed to verify those performance characteristics; (b) selecting a portable test instrument adapted to electronically store a test routine for the cable to be tested; (c) transferring the database into the portable test instrument; (d) positioning the test instrument with the database contained therein at the building site; (e) physically connecting a pair of compatible Gigabit Ethernet chips to respective ends of the cable; (f) physically connecting the portable test instrument to one end of the electrical cable through one of the associated Gigabit Ethernet chips; (g) physically connecting an intelligent remote terminal to the other end of the cable through the other associated Gigabit Ethernet chip; and (h) then actuating the test instrument to apply the test routine to the electrical cable.

7. A method of managing the installation of electrical cables in a building and of testing electrical cables installed in a building, comprising the steps of: creating a computer database that specifies a plurality of cables, port locations where each of the cables is to be connected, desired performance characteristics for the respective cables, and test regimens for the respective cables; selecting a handheld portable test instrument having a data input, a display screen, a connection port for connecting to an end of a cable, cable selections keys, and a test actuation key; loading into the test instrument a comparison routine for comparing test results with a performance specification, and a plurality of test regimens of differing complexity; loading the database into the test instrument; positioning the test instrument with the database contained therein at the building site; physically connecting the connection port of the test instrument to an end of a particular cable; operating the cable selection keys until a listing of the same cable appears on the display screen; and then actuating the test actuation key so that in accordance with the database plan the test regimen for that cable will be generated by the test instrument and applied to that cable, and the test instrument will compare the test results with the performance specification for that cable.

8. A hand-held portable test instrument for testing electrical cables after their installation in a building, the test instrument comprising: a housing having a data input, a display screen, and a port for physical connection to an end of a cable to be tested; the test instrument having loaded therein a plurality of test regimens of differing complexity, and a comparison routine for comparing test information received in response to a selected test regimen with a performance standard; the test instrument also being adapted to have loaded therein a plan database specifying a plurality of cables, port locations where each of the cables is to be connected, desired performance standards for respective cables, and test regimens for respective cables for verifying compliance with the performance standards; the test instrument also having cable selection keys mounted on the housing for selecting a cable identified in the database and displaying the identification of that selected cable on the display screen; and the test instrument also having mounted on the housing a test actuation key operable when the displayed cable identification corresponds to the physically connected cable to generate the corresponding test regimen so that the test instrument may then compare test information with the performance standard for that cable.

9. A handheld portable test instrument for testing electrical cables after their installation in a building, the test instrument comprising: a housing having a port for physically connecting an end of a cable to be tested, and a display screen; the test instrument containing therein a plurality of test regimens of differing complexity, and a comparison routine for comparing test information received in response to a selected test regimen with a performance standard; the test instrument also having a data input for receiving a plan database specifying a plurality of cables; the test instrument also having cable selection keys for selecting a cable identified in the database and for displaying the identification of a selected cable on the display screen; and a test actuation key on the housing and operable to generate a test regimen for testing a cable connected to the test instrument.

10. Apparatus for planning, installing, and verifying a set of electrical cables in a building, comprising:

(a) a computer; (b) a program resident in the computer and adapted to create a computer database with a graphic display of existing room layouts in the building, specified ports for proposed cable terminations, representations of the cable types selected to be connected to respective ports, and a representation of the plan for intended use of each cable; (c) a portable test instrument having data processing capability compatible with the computer so that it can both receive the plan information from the computer and transfer data back into the computer; (d) a remote terminal unit compatible with the portable test instrument and adapted to be connected to the remote end of a cable being tested to selectively transmit information back to the portable test instrument; (e) the portable test instrument having the capability to selectively energize the remote terminal unit and instruct the remote terminal unit to provide test information back to it; (f) the portable test instrument also being adapted to test the performance of each separate cable of the completed installation specifically against requirements for its intended use at that location, and to store the test results in the test instrument;

(g) the portable test instrument being adapted to transmit the plan and test results back to the computer; and (h) a printer associated with the computer to print out for a business purpose both the plan information and the comparison test results.

* * * * *